(12) United States Patent
Lee et al.

(10) Patent No.: US 10,285,120 B2
(45) Date of Patent: May 7, 2019

(54) TECHNIQUES AND APPARATUSES FOR COMMON SEARCH SPACE DETERMINATION

(71) Applicant: QUALCOMM Incorporated, San Diego, CA (US)

(72) Inventors: Heechoon Lee, San Diego, CA (US); Peter Gaal, San Diego, CA (US); Wanshi Chen, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/980,570

(22) Filed: May 15, 2018

(65) Prior Publication Data

US 2018/0262977 A1    Sep. 13, 2018

Related U.S. Application Data

(63) Continuation-in-part of application No. 15/828,009, filed on Nov. 30, 2017.

(60) Provisional application No. 62/506,960, filed on May 16, 2017, provisional application No. 62/429,582, filed on Dec. 2, 2016.

(51) Int. Cl.
| | |
|---|---|
| *H04W 48/16* | (2009.01) |
| *H04L 1/00* | (2006.01) |
| *H04L 5/00* | (2006.01) |
| *H04L 1/18* | (2006.01) |

(52) U.S. Cl.
CPC ............ *H04W 48/16* (2013.01); *H04L 1/0026* (2013.01); *H04L 1/1812* (2013.01); *H04L 5/001* (2013.01)

(58) Field of Classification Search
CPC ....... H04L 5/003; H04L 5/0048; H04L 5/005; H04L 5/0053; H04W 72/04; H04W 72/0406; H04W 72/042
See application file for complete search history.

(56) References Cited

U.S. PATENT DOCUMENTS

| | | | |
|---|---|---|---|
| 9,166,718 | B2 | 10/2015 | Chen et al. |
| 2008/0192845 | A1 | 8/2008 | Aizawa et al. |
| 2012/0281594 | A1 | 11/2012 | Stewart et al. |

(Continued)

OTHER PUBLICATIONS

Samsung, "Configuration and Functionalities of Common Search Space", Apr. 2017; 3GPP TSG RAN WG1 #88bis—R1-1705379. (Year: 2017).*

(Continued)

*Primary Examiner* — Robert C Scheibel
(74) *Attorney, Agent, or Firm* — Qualcomm IP Dept.; James Hunt Yancey, Jr.

(57) ABSTRACT

Various aspects of the present disclosure generally relate to wireless communication. In some aspects, a user equipment may receive when operating in a network that provides synchronization signals at a plurality of locations in a channel bandwidth, a common search space (CSS) indicator for a synchronization signal, wherein the CSS indicator indicates that the synchronization signal is not associated with a CSS for a downlink control channel. The user equipment may determine a location of the CSS for the downlink control channel based at least in part on the CSS indicator. Numerous other aspects are provided.

30 Claims, 9 Drawing Sheets

(56) References Cited

U.S. PATENT DOCUMENTS

| | | | |
|---|---|---|---|
| 2013/0058240 A1* | 3/2013 | Kim | H04L 5/0007 370/252 |
| 2013/0143502 A1 | 6/2013 | Kazmi et al. | |
| 2014/0128085 A1 | 5/2014 | Charbit | |
| 2016/0043849 A1* | 2/2016 | Lee | H04L 5/0053 370/329 |
| 2016/0308637 A1 | 10/2016 | Frenne et al. | |
| 2017/0094624 A1 | 3/2017 | Balachandran et al. | |
| 2017/0280484 A1 | 9/2017 | Awad | |
| 2018/0084593 A1* | 3/2018 | Chen | H04W 76/11 |
| 2018/0159649 A1 | 6/2018 | Sun et al. | |
| 2018/0167155 A1 | 6/2018 | Sun et al. | |
| 2018/0167946 A1 | 6/2018 | Si et al. | |
| 2018/0192383 A1* | 7/2018 | Nam | H04W 56/001 |
| 2018/0192412 A1* | 7/2018 | Novlan | H04W 76/10 |
| 2018/0199343 A1* | 7/2018 | Deogun | H04W 72/0453 |

OTHER PUBLICATIONS

Nokia, Alcatel-Lucent and Shanghai Bell, "On Remaining System Information Delivery", Apr. 2017; 3GPP TSG RAN WG1 #88bis—R1-1705841. (Year: 2017).*

NTT Docomo, Inc., "Discussion on remaining system information delivery in NR", Apr. 2017; 3GPP TSG RAN WG1 #88bis—R1-1705709. (Year: 2017).*

Huawei, HiSilicon, "Search Space Design Considerations", Apr. 2017; 3GPP TSG RAN WG1 #88bis—R1-1704202. (Year: 2017).*

Catt: "Offline Summary for AI 7.1.2.2 Remaining Details on Remaining Minimum System Information", 3GPP TSG RAN WG1 Meeting #90bis, R1-1719145, Prague, CZ, Oct. 9-13, 2017, pp. 1-15.

Huawei: "Email discussion [86b-20] on synchronization and carrier rasters for NR," 3GPP Draft; R1-1611684, Email Discussions 86B-20 on Synchronization and Carrier Rasters for NR V5, 3rd Generation Partnership Project (3GPP), Mobile Competence Centre; 650, Route Des Lucioles; F-0692, vol. RAN WG1, Reno, USA; Nov. 14-18, 2016, Nov. 14, 2016 (Nov. 14, 2016), XP051176990, 11 pages. Retrieved from the Internet: URL: http://www.3gpp.org/ftp/Meetings_3GPP Sync/RAN1/Docs/ [retrieved on Nov. 14, 2016].

International Search Report and Written Opinion—PCT/US2017/064294—ISA/EPO—dated Mar. 26, 2018.

Samsung: "Remaining Minimum System Information Delivery", 3GPP TSG RAN WG1 Meeting #90, R1-1713556, Prague, Czechia, Aug. 21-25, 2017, pp. 1-5.

Sengupta S., et al., "SpiderRadio: A Cognitive Radio Network with Commodity Hardware and Open Source Software", IEEE Communications Magazine, IEEE Service Center, Piscataway, US, vol. 49, No. 3, Mar. 1, 2011 (Mar. 1, 2011), pp. 101-109, XP011349626, ISSN: 0163-6804, DOI: 10.11 09/MCOM.2011.5723806.

U.S. Appl. No. 15/968,569, filed May 1, 2018.

* cited by examiner

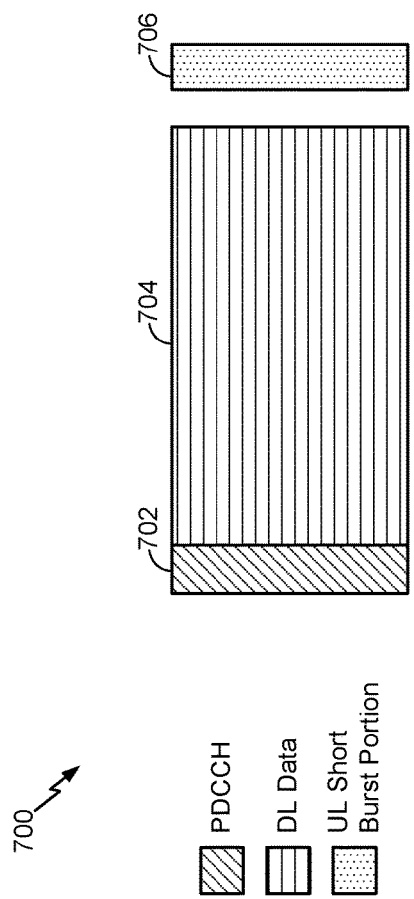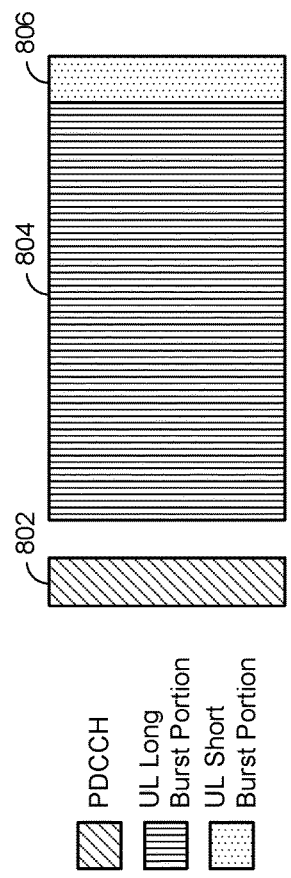

TECHNIQUES AND APPARATUSES FOR COMMON SEARCH SPACE DETERMINATION

CROSS-REFERENCE TO RELATED APPLICATIONS UNDER 35 U.S.C. § 119 and 35 U.S.C. § 120

This application claims priority to U.S. Provisional Patent Application No. 62/506,960, filed on May 16, 2017, entitled "TECHNIQUES AND APPARATUSES FOR COMMON SEARCH SPACE DETERMINATION," which is hereby expressly incorporated by reference herein. This application is also a continuation-in-part of U.S. patent application Ser. No. 15/828,009, filed on Nov. 30, 2017, entitled "TECHNIQUES FOR TRANSMITTING OR USING A PULL-IN SIGNAL TO LOCATE A SYNCHRONIZATION CHANNEL," which claims priority to U.S. Provisional Patent Application No. 62/429,582, filed on Dec. 2, 2016, both of which are hereby expressly incorporated by reference herein.

TECHNICAL FIELD OF THE DISCLOSURE

Aspects of the technology described below generally relate to wireless communication, and more particularly to techniques and apparatuses for common search space determination. Embodiments and techniques enable and provide wireless communication devices and systems that conserve network resources.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The sole purpose of this summary is to present some concepts of one or more aspects of the disclosure in summary form as a prelude to the more detailed description that is presented later.

In some aspects, a method of wireless communication, performed by a user equipment, may include receiving, when operating in a network that provides synchronization signals at a plurality of locations in a channel bandwidth, a common search space (CSS) indicator for a synchronization signal, wherein the CSS indicator indicates that the synchronization signal is not associated with a CSS for a downlink control channel. The method may include determining a location of the CSS for the downlink control channel based at least in part on the CSS indicator.

In some aspects, a user equipment for wireless communication may include a memory and one or more processors, operatively coupled to the memory, configured to receive, when operating in a network that provides synchronization signals at a plurality of locations in a channel bandwidth, a CSS indicator for a synchronization signal, wherein the CSS indicator indicates that the synchronization signal is not associated with a CSS for a downlink control channel. The one or more processors may be configured to determine a location of the CSS for the downlink control channel based at least in part on the CSS indicator.

In some aspects, a non-transitory computer-readable medium may store one or more instructions for wireless communication. The one or more instructions, when executed by one or more processors of a user equipment, may cause the one or more processors to receive, when operating in a network that provides synchronization signals at a plurality of locations in a channel bandwidth, a CSS indicator for a synchronization signal, wherein the CSS indicator indicates that the synchronization signal is not associated with a CSS for a downlink control channel. The one or more instructions, when executed by the one or more processors, may cause the one or more processors to determine a location of the CSS for the downlink control channel based at least in part on the CSS indicator.

In some aspects, an apparatus for wireless communication may include means for receiving, when operating in a network that provides synchronization signals at a plurality of locations in a channel bandwidth, a CSS indicator for a synchronization signal, wherein the CSS indicator indicates that the synchronization signal is not associated with a CSS for a downlink control channel. The apparatus may include means for determining a location of the CSS for the downlink control channel based at least in part on the CSS indicator.

Aspects generally include a method, apparatus, system, computer program product, non-transitory computer-readable medium, user equipment, wireless communication device, base station, and processing system as substantially described herein with reference to and as illustrated by the accompanying specification and drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only some aspects of this disclosure and are therefore not to be considered limiting of its scope, for the description may admit to other equally effective aspects. The same reference numbers in different drawings may identify the same or similar elements.

FIG. 7 is a diagram illustrating an example of a downlink (DL)-centric subframe, in accordance with various aspects of the present disclosure.

FIG. 8 is a diagram illustrating an example of an uplink (UL)-centric subframe, in accordance with various aspects of the present disclosure.

DETAILED DESCRIPTION

Figure 1:
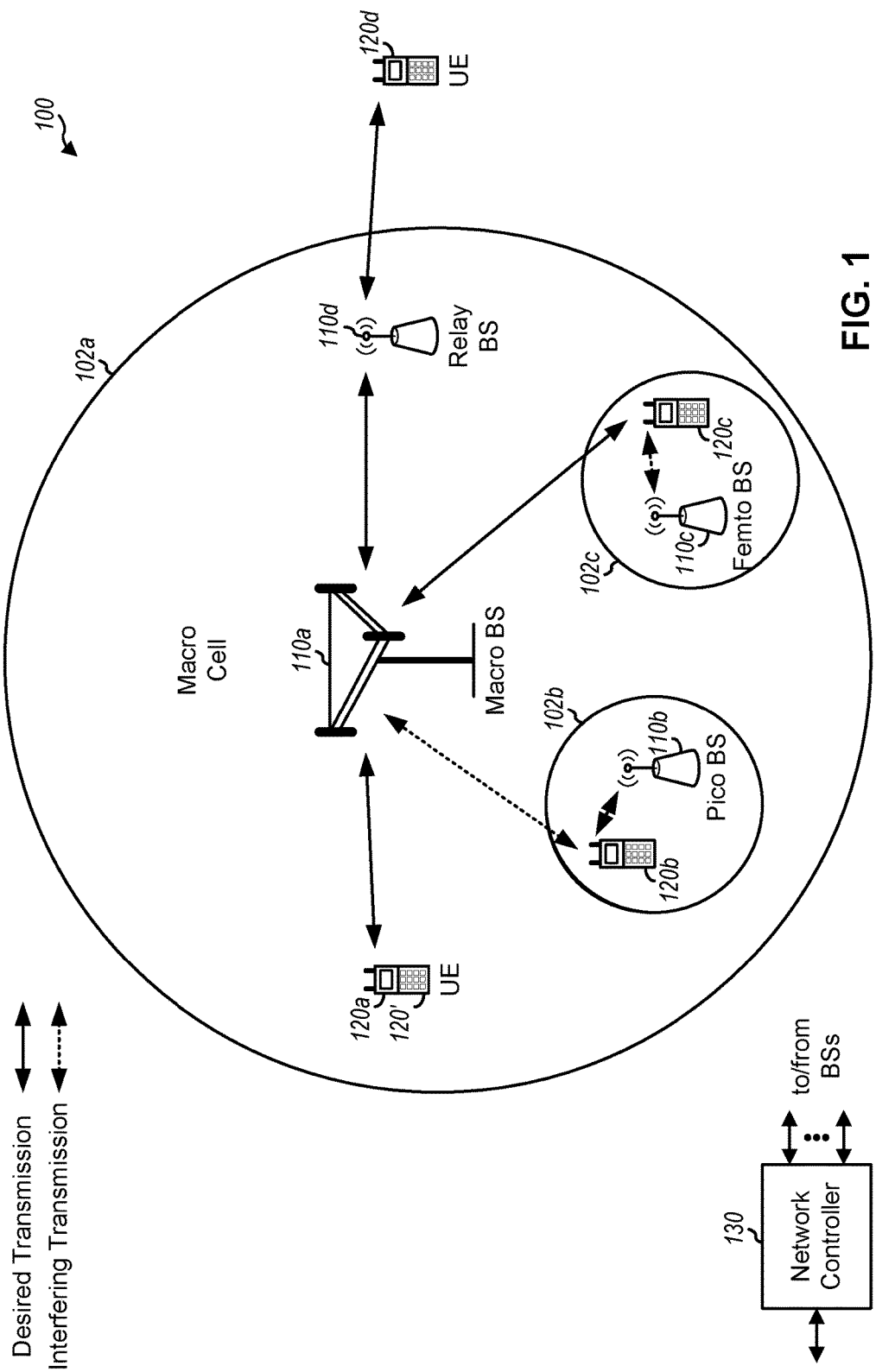
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Node B (NB), gNB, 5G NB, NR BS, Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE). UE 120 may be included inside a housing 120' that houses components of UE 120, such as processor components, memory components, and/or the like.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
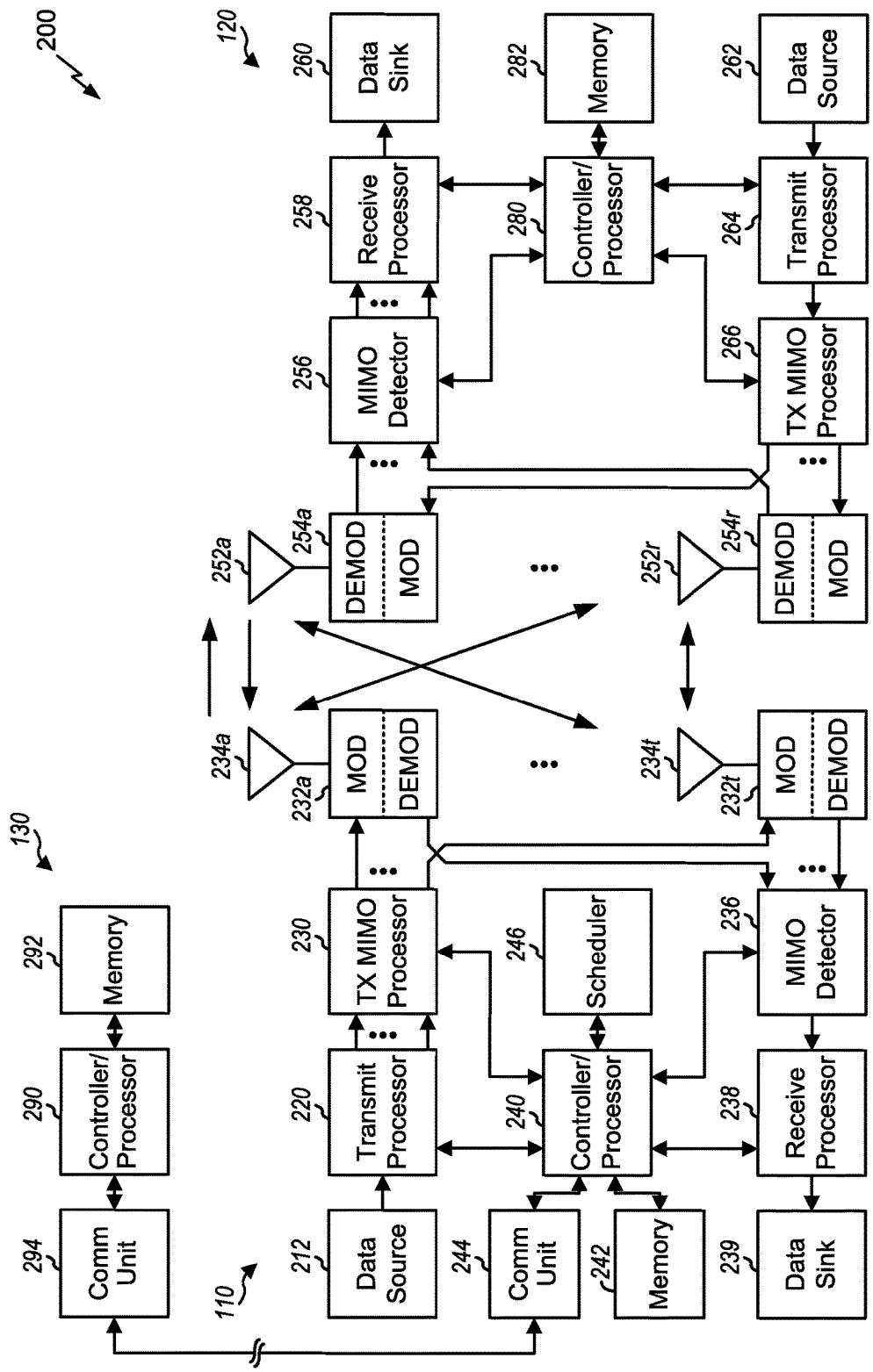
FIG. 2 shows a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to perform common search space determination. For example, controller/processor 280 and/or other processors and modules at UE 120, may perform or direct operations of UE 120 to perform common search space determination. For example, controller/processor 280 and/or other controllers/processors and modules at UE 120 may perform or direct operations of, for example, process 1000 of FIG. 10 and/or other processes as described herein. In some aspects, one or more of the components shown in FIG. 2 may be employed to perform process 1000 of FIG. 10 and/or other processes for the techniques described herein. Memories 242 and 282 may store data and program codes for base station 110 and UE 120, respectively. A scheduler 246 may schedule UEs for data transmission on the downlink and/or uplink.

In some aspects, UE 120 may include means for receiving, when operating in a network that provides synchronization signals at a plurality of locations in a channel bandwidth, a CSS indicator for a synchronization signal, wherein the CSS indicator indicates that the synchronization signal is not associated with a CSS for a downlink control channel; means for determining a location of the CSS for the downlink control channel based at least in part on the CSS indicator; and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3:
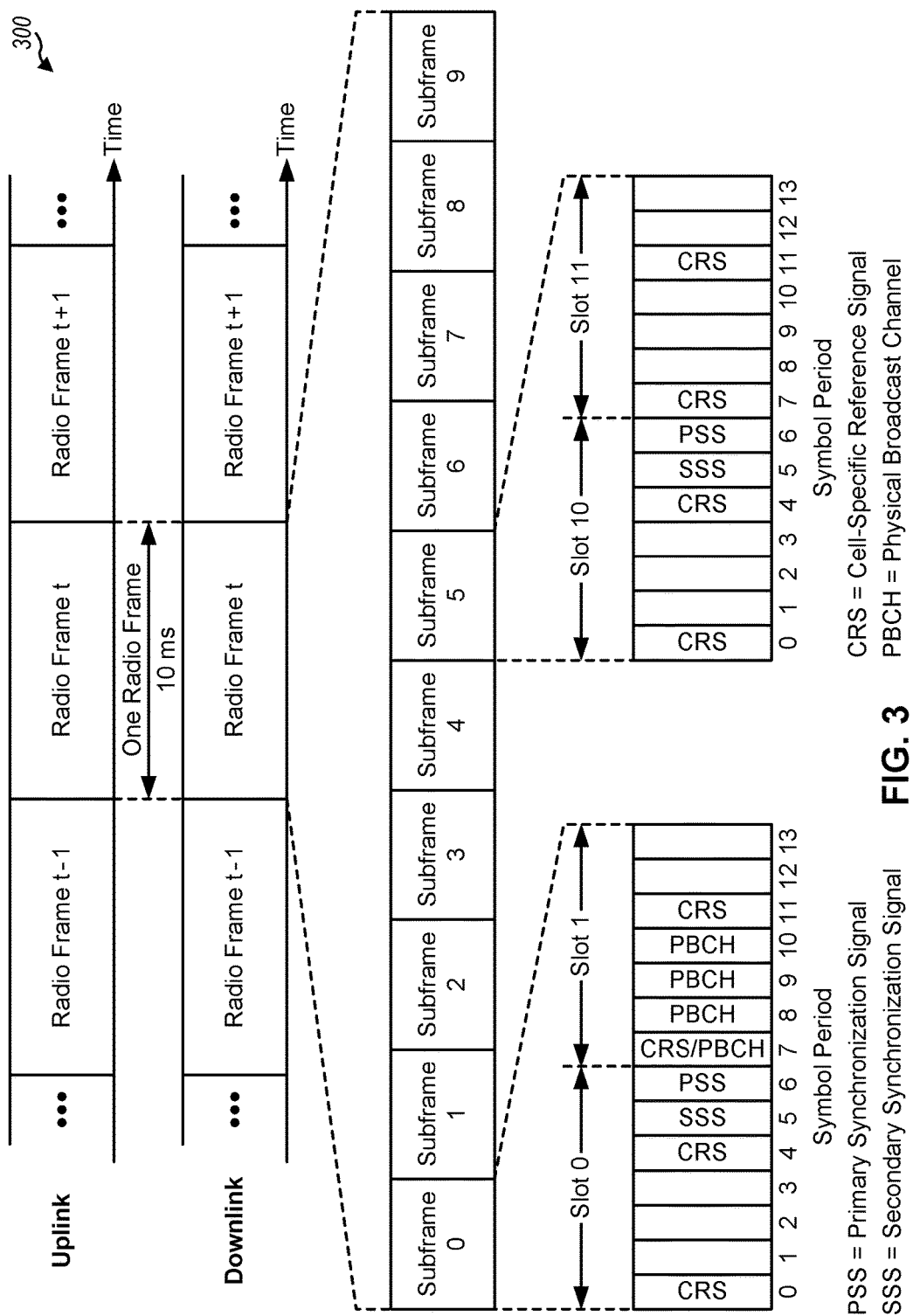
FIG. 3 is a block diagram conceptually illustrating an example of a frame structure in a wireless communication network, in accordance with various aspects of the present disclosure.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19.

Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In some communication systems (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. In LTE, synchronization signals, such as the PSS or the SSS, may be located at a center of a channel bandwidth.

In other communication systems (e.g., NR), in contrast, synchronization signals (e.g., the PSS, the SSS, a physical broadcast channel (PBCH), a demodulation reference signal, and/or the like) may be located at multiple locations within a channel bandwidth. For example, a BS may transmit synchronization signals at multiple frequency locations in a channel bandwidth and/or at multiple times within the channel bandwidth. In this way, the BS may enable a plurality of UEs with a limited bandwidth capacity (e.g., narrowband (NB) UEs) to access the synchronization signals, and may improve radio resource management relative to other communication systems.

The PSS and SSS may be used by UEs for cell search and acquisition. The BS may transmit a cell-specific reference signal (CRS) across the system bandwidth for each cell supported by the BS. In some communication systems (e.g., LTE), the CRS may be transmitted in certain symbol periods of each subframe and may be used by the UEs to perform channel estimation, channel quality measurement, and/or other functions. The BS may also transmit a PBCH in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
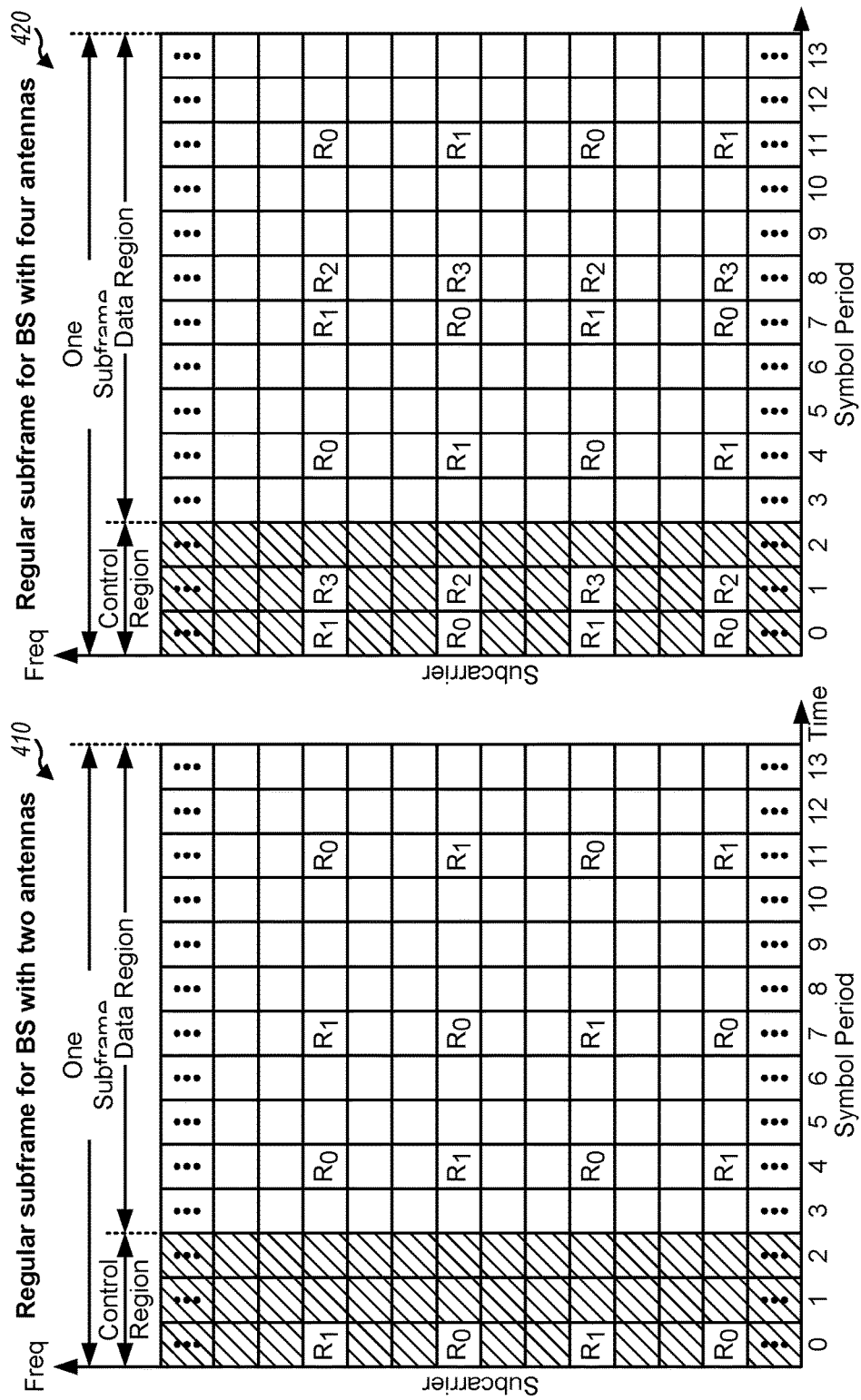
FIG. 4 is a block diagram conceptually illustrating two example subframe formats with the normal cyclic prefix, in accordance with various aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in various communication systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with pre-coding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
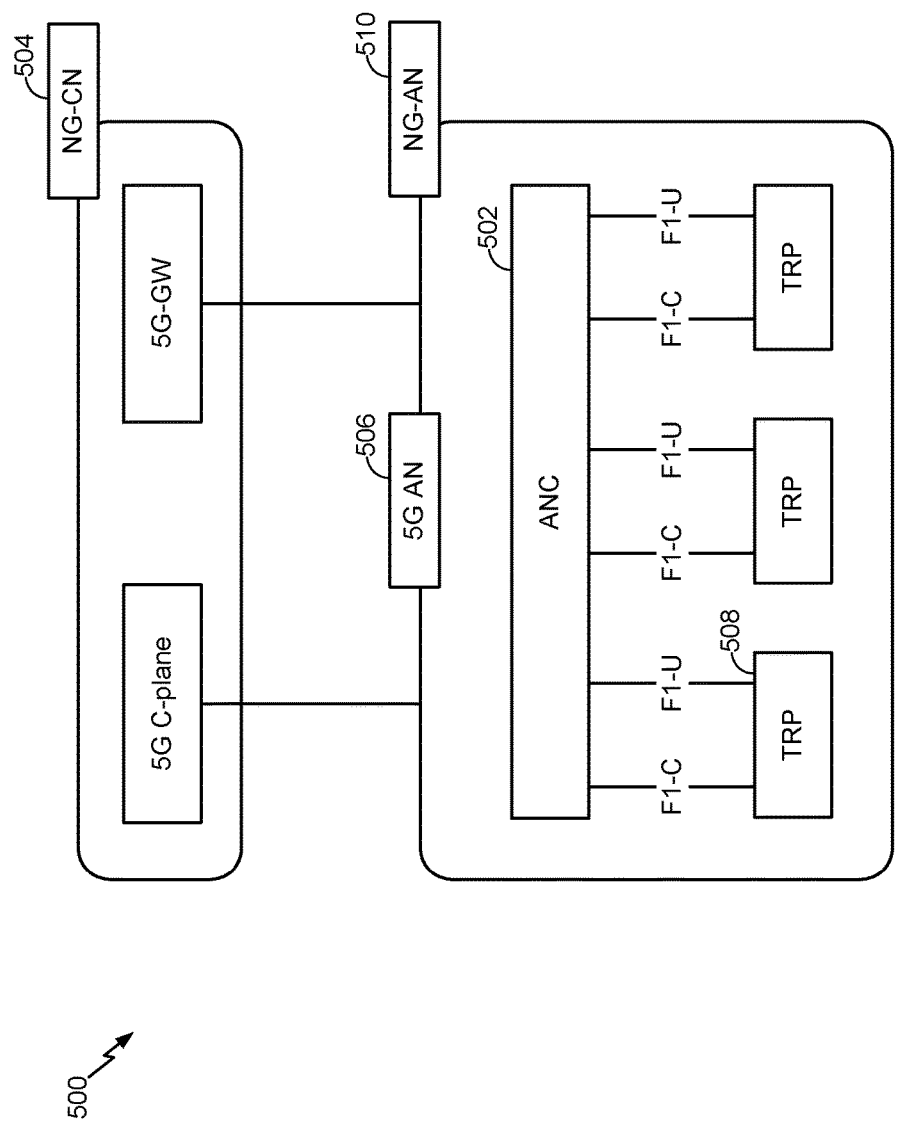
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The PDCP, RLC, MAC protocol may be adaptably placed at the ANC or TRP.

In some aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
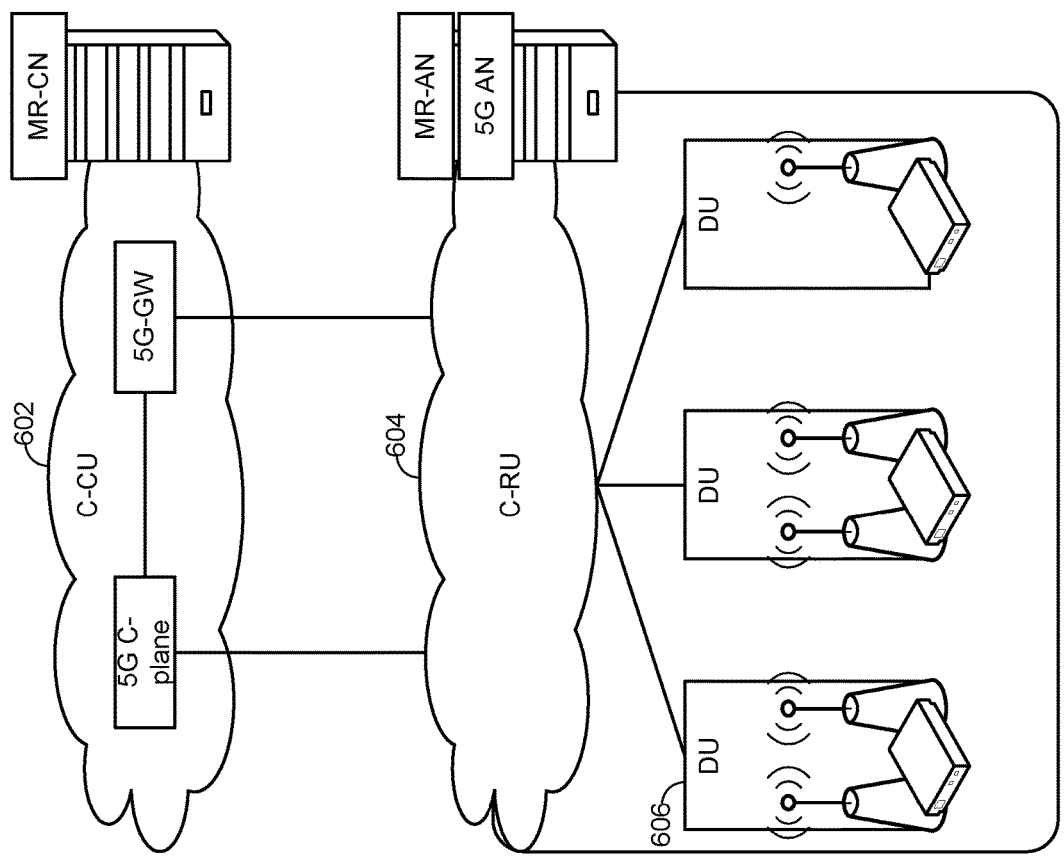
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, etc.), and/or the like.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

In some communication systems (e.g., LTE), synchronization signals, such as a PSS, an SSS, and/or the like, may be located at a center of a channel bandwidth. The UE may receive a synchronization signal and may determine a common search space (CSS) for a downlink control channel based at least in part on the synchronization signal. The CSS may be paired with a synchronization signal. The UE may determine information associated with the CSS, such as by decoding the CSS, to receive information from a BS to access a network associated with the BS. However, in other communication systems (e.g., NR), synchronization signals may be located at a plurality of locations (e.g., frequency and/or time locations) in a channel bandwidth. In this case, pairing each synchronization signal in the channel bandwidth with a separate CSS may cause an excessive utilization of network resources.

Some aspects, described herein, may enable some synchronization signals to be paired with a CSS, and other synchronization signals not to be paired with a CSS. For example, the BS may allocate network resources for a plurality of synchronization signals and a single CSS in the channel bandwidth. In another example, the BS may allocate network resources for a plurality of CSSs in the channel bandwidth, but may include fewer CSSs in the channel bandwidth than synchronization signals in the channel bandwidth.

Some aspects, described herein, may provide techniques and apparatuses for common search space determination to enable some synchronization signals not to be paired with a CSS. For example, a UE may receive a CSS indicator for a synchronization signal, and may determine a CSS for a downlink control channel based at least in part on the CSS indicator. In this case, the CSS indicator may indicate that the synchronization signal is not associated with a CSS for the downlink control channel, and/or may provide an indication of another synchronization signal location in the channel bandwidth for another synchronization signal that is associated with the CSS. Additionally, or alternatively, the CSS indicator may provide an indication of a CSS associated with another synchronization signal. In this way, a UE may determine a location of a CSS and may decode the CSS to obtain information associated with accessing the network. Moreover, based at least in part on enabling the UE to determine the location of the CSS, some aspects described herein enable a synchronization signal to not be paired with a CSS, thereby improving network performance relative to each synchronization signal being paired with a respective CSS.

Figure 9:
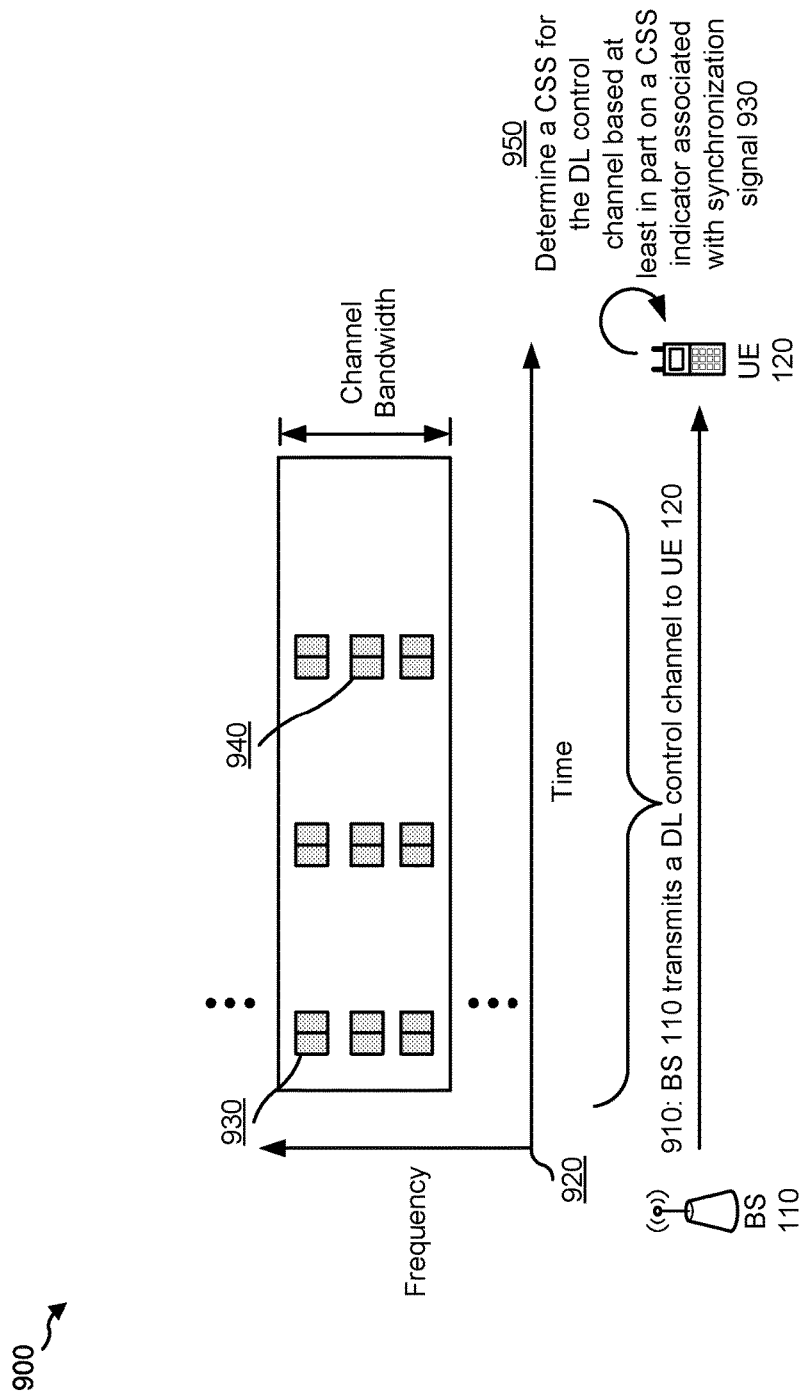
FIG. 9 is a diagram illustrating an example of common search space determination, in accordance with various aspects of the present disclosure.

FIG. 9 is a diagram illustrating an example 900 of CSS determination, in accordance with various aspects of the present disclosure. As shown in FIG. 9, example 900 includes BS 110 and UE 120.

As further shown in FIG. 9, and by reference number 910, BS 110 may transmit a downlink control channel 920 to UE 120. In some aspects, downlink control channel 920 may include a plurality of regions. For example, BS 110 may provide a channel bandwidth with a plurality of CSSs, wherein each CSS is located within a control region of the channel bandwidth. Downlink control channel 920 may include a plurality of synchronization signals at a plurality of frequency and/or time locations of a channel bandwidth. Downlink control channel 920 may carry a synchronization signal 930 that is, for example, not paired with a CSS, and may carry a synchronization signal 940 that is, for example, paired with a CSS.

In some aspects, a single CSS may be included in downlink control channel 920. For example, downlink control channel 920 may carry a plurality of synchronization signals, such as synchronization signal 930, synchronization signal 940, and/or the like, and may include a single CSS associated with, for example, synchronization signal 940. In this case, synchronization signal 940 being associated with a CSS may permit a location of the CSS to be determined based at least in part on a location of synchronization signal 940. In some aspects, a plurality of CSSs may be included in downlink control channel 920. For example, downlink control channel 920 may include a quantity of synchronization signals that is greater than the quantity of CSSs, such that at least one synchronization signal, such as synchronization signal 930, is not associated with a CSS of the plurality of CSSs. In this case, synchronization signal 930 not being associated with a CSS may permit a CSS location to be determined based at least in part on information other than a location of synchronization signal 930, such as based at least in part on a CSS indicator, as described herein.

In some aspects, BS 110 may generate a CSS indicator of a PBCH for one or more of the synchronization signals. For example, BS 110 may set a one-bit flag to indicate that a particular synchronization signal, such as synchronization signal 930, is not associated with a CSS for a PBCH, which is associated with providing information for UE 120 to access a network. In some aspects, BS 110 may set the CSS indicator to identify another location of another synchronization signal that is associated with a CSS. For example, BS 110 may set a CSS indicator for synchronization signal 930, which is not associated with a CSS, to identify a location of synchronization signal 940, which is associated with a CSS. Additionally, or alternatively, BS 110 may set a CSS indicator to identify a location of a CSS associated with another synchronization signal. For example, BS 110 may cause a CSS indicator for synchronization signal 930 to identify a CSS associated with synchronization signal 940.

As further shown in FIG. 9, and by reference number 950, UE 120 may determine a CSS for downlink control channel 920 based at least in part on a CSS indicator associated with synchronization signal 930. For example, UE 120 may receive synchronization signal 930 of downlink control channel 920, may determine, based at least in part on the CSS indicator associated with synchronization signal 930 and received in a PBCH, that synchronization signal 930 is not associated with a CSS, and may determine a location for a CSS associated with another synchronization signal. In this case, UE 120 may identify decoding candidates in the CSS and may decode a decoding candidate in the CSS based at least in part on the CSS indicator included in the PBCH.

In some aspects, UE 120 may receive another synchronization signal based at least in part on determining that synchronization signal 930 is not associated with a CSS. For example, UE 120 may receive synchronization signal 940, and may determine the CSS associated with synchronization signal 940. In some aspects, UE 120 may receive synchronization signal 940 based at least in part on information included in the CSS indicator for synchronization signal 930. For example, UE 120 may determine a location of synchronization signal 940 in the channel bandwidth based at least in part on the CSS indicator of synchronization signal 930. In some aspects, UE 120 may acquire the synchronization signal 940 to determine a location of another CSS associated with synchronization signal 940. Additionally, or alternatively, UE 120 may determine a location of another CSS associated with synchronization signal 940 based at least in part on a location of synchronization signal 940. In some aspects, UE 120 may identify the CSS associated with synchronization signal 940 based at least in part on the CSS indicator of synchronization signal 930. For example, UE 120 may determine, based at least in part on the CSS indicator of synchronization signal 930, a location of a CSS associated with synchronization signal 940, and may access the CSS associated with synchronization signal 940 to determine information associated with accessing the network. In this way, UE 120 may determine a CSS to receive information associated with accessing a network, and may access the network based at least in part on the information.

As indicated above, FIG. 9 is provided as an example. Other examples are possible and may differ from what was described with respect to FIG. 9.

Figure 10:
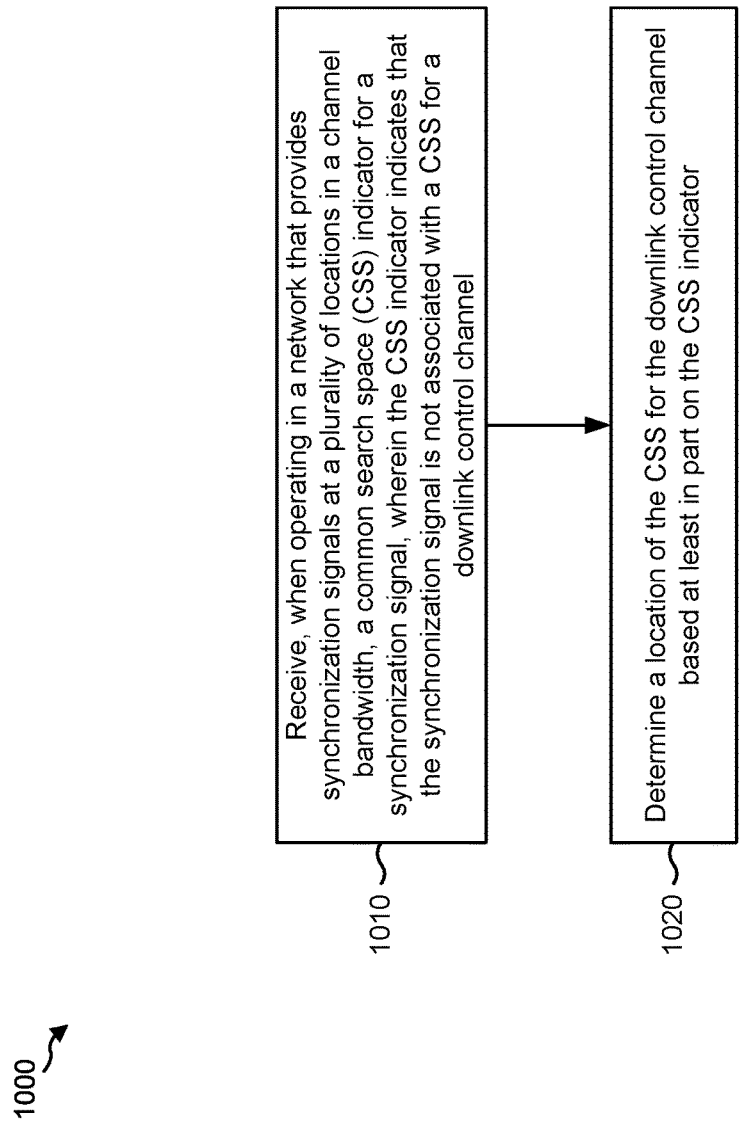
FIG. 10 is a diagram illustrating an example process performed, for example, by a user equipment, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120) performs CSS determination.

As shown in FIG. 10, in some aspects, process 1000 may include receiving, when operating in a network that provides synchronization signals at a plurality of locations in a channel bandwidth, a common search space (CSS) indicator for a synchronization signal, wherein the CSS indicator indicates that the synchronization signal is not associated with a CSS for a downlink control channel (block 1010). For example, the UE (e.g., using antenna 252, DEMOD 254, MIMO detector 256, receive processor 258, controller/processor 280, and/or the like) may receive a CSS indicator for a synchronization signal, as described above in connection with FIG. 9. In some aspects, the CSS indicator indicates that the synchronization signal is not associated with a CSS for a downlink control channel. In some aspects, the UE may receive the CSS indicator when operating in a network that provides synchronization signals at a plurality of locations in a channel bandwidth. In some aspects, the UE may receive the CSS indicator for the synchronization signal from base station (e.g., BS 110).

In some aspects, the CSS indicator is received in a physical broadcast channel. In some aspects, the CSS indicator is a one-bit flag. For example, the one-bit flag may indicate that the synchronization signal is not associated with a CSS. In this case, the UE may utilize other information to determine the location of the CSS, such as other information identifying a location of another synchronization signal. In some aspects, the network is a new radio (NR) network. In some aspects, the channel bandwidth includes a plurality of synchronization signals and a single CSS, and the plurality of synchronization signals includes the synchronization signal and the CSS is the single CSS. In some aspects, the channel bandwidth includes a plurality of synchronization signals and a plurality of CSSs, a quantity of synchronization signals, in the plurality of synchronization signals, is greater than a quantity of CSSs in the plurality of CSSs, and the plurality of synchronization signals includes the synchronization signal and the plurality of CSSs includes the CSS. In other words, the channel bandwidth may include synchronization signals with a many-to-one relationship to a set of CSSs.

As further shown in FIG. 10, in some aspects, process 1000 may include determining a location of the CSS for the downlink control channel based at least in part on the CSS indicator (block 1020). For example, the UE (e.g., using controller/processor 280 and/or the like) may determine the location of the CSS in a downlink control channel based at least in part on the CSS indicator, as described above in connection with FIG. 9. In some aspects, the decoding candidates in the CSS are identified based at least in part on information in the physical broadcast channel. In some aspects, the CSS indicator includes information identifying a location of another synchronization signal in the channel bandwidth, and the CSS is identified based at least in part on the other synchronization signal. In some aspects, the CSS indicator includes a pointer identifying the CSS.

Process 1000 may include additional aspects, such as any single aspect or any combination of aspects described below and/or in connection with one or more other processes described elsewhere herein.

In some aspects, the CSS indicator is received in a physical broadcast channel (PBCH). In some aspects, the location of the CSS is determined based at least in part on the physical broadcast channel. In some aspects, the CSS indicator includes information identifying a location of another synchronization signal that is associated with the CSS; and the location of the CSS is determined based at least in part on the other synchronization signal. In some aspects, the other synchronization signal is in the channel bandwidth.

In some aspects, the CSS indicator includes a one-bit flag that indicates that the synchronization signal is not associated with a CSS for the downlink control channel. In some aspects, the channel bandwidth includes a plurality of synchronization signals and a plurality of CSSs; a quantity of synchronization signals, included in the plurality of synchronization signals, is greater than a quantity of CSSs included in the plurality of CSSs; and the plurality of synchronization signals includes the synchronization signal and the plurality of CSSs includes the CSS. In some aspects, the UE is configured to access the CSS based at least in part on determining the location of the CSS, wherein the CSS includes information associated with accessing the network.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, when operating in a network that provides synchronization signals at a plurality of locations, a common search space (CSS) indicator for a synchronization signal of a plurality of synchronization signals,
      wherein the CSS indicator indicates that the synchronization signal is not associated with a CSS for a downlink control channel,
      wherein the CSS indicator includes information regarding another synchronization signal, of the plurality of synchronization signals, that is associated with the CSS,
      wherein a quantity of synchronization signals, included in the plurality of synchronization signals, is greater than a quantity of CSSs included in a plurality of CSSs, and
      wherein the plurality of CSSs include the CSS; and
   determining a location of the CSS for the downlink control channel based at least in part on the CSS indicator.

2. The method of claim 1, wherein the CSS indicator is received in a physical broadcast channel (PBCH).

3. The method of claim 2, wherein the location of the CSS is determined based at least in part on the physical broadcast channel.

4. The method of claim 1,
   wherein the information regarding the other synchronization signal includes information identifying a location of the other synchronization signal; and
   wherein the location of the CSS is determined based at least in part on the other synchronization signal.

5. The method of claim 1, wherein the other synchronization signal is in a channel bandwidth in which the synchronization signals are located.

6. The method of claim 1, wherein the CSS indicator includes a flag that indicates that the synchronization signal is not associated with the CSS for the downlink control channel.

7. The method of claim 1, wherein a channel bandwidth, in which the synchronization signals are located, includes the plurality of synchronization signals and the plurality of CSSs.

8. The method of claim 1,
   wherein the UE is configured to access the CSS based at least in part on determining the location of the CSS, and
   wherein the CSS includes information associated with accessing the network.

9. A user equipment (UE) for wireless communication, comprising:
   memory; and
   one or more processors coupled to the memory, the memory and the one or more processors configured to:
      receive, when operating in a network that provides synchronization signals at a plurality of locations, a common search space (CSS) indicator for a synchronization signal of a plurality of synchronization signals,
         wherein the CSS indicator indicates that the synchronization signal is not associated with a CSS for a downlink control channel, wherein the CSS indicator includes information regarding another synchronization signal, of the plurality of synchronization signals, that is associated with the CSS,
wherein a quantity of synchronization signals, included in the plurality of synchronization signals, is greater than a quantity of CSSs included in a plurality of CSSs, and
wherein the plurality of CSSs include the CSS; and
determine a location of the CSS for the downlink control channel based at least in part on the CSS indicator.

10. The UE of claim 9, wherein the CSS indicator is received in a physical broadcast channel (PBCH).

11. The UE of claim 10, wherein the location of the CSS is determined based at least in part on the physical broadcast channel.

12. The UE of claim 9,
wherein the information regarding the other synchronization signal includes information identifying a location of the other synchronization signal; and
wherein the location of the CSS is determined based at least in part on the other synchronization signal.

13. The UE of claim 9 wherein the other synchronization signal is in a channel bandwidth in which the synchronization signals are located.

14. The UE of claim 9, wherein the CSS indicator includes a flag that indicates that the synchronization signal is not associated with the CSS for the downlink control channel.

15. The UE of claim 9, wherein a channel bandwidth, in which the synchronization signals are located, includes the plurality of synchronization signals and the plurality of CSSs.

16. The UE of claim 9,
wherein the UE is configured to access the CSS based at least in part on determining the location of the CSS, and
wherein the CSS includes information associated with accessing the network.

17. A non-transitory computer-readable medium storing one or more instructions for wireless communication, the one or more instructions comprising:
one or more instructions that, when executed by one or more processors of a user equipment (UE), cause the one or more processors to:
receive, when operating in a network that provides synchronization signals at a plurality of locations, a common search space (CSS) indicator for a synchronization signal of a plurality of synchronization signals,
wherein the CSS indicator indicates that the synchronization signal is not associated with a CSS for a downlink control channel,
wherein the CSS indicator includes information regarding another synchronization signal, of the plurality of synchronization signals, that is associated with the CSS,
wherein a quantity of synchronization signals, included in the plurality of synchronization signals, is greater than a quantity of CSSs included in a plurality of CSSs, and
wherein the plurality of CSSs include the CSS; and
determine a location of the CSS for the downlink control channel based at least in part on the CSS indicator.

18. The non-transitory computer-readable medium of claim 17, wherein the CSS indicator is received in a physical broadcast channel (PBCH).

19. The non-transitory computer-readable medium of claim 18, wherein the location of the CSS is determined based at least in part on the physical broadcast channel.

20. The non-transitory computer-readable medium of claim 17,
wherein the information regarding the other synchronization signal includes information identifying a location of the other synchronization signal; and
wherein the location of the CSS is determined based at least in part on the other synchronization signal.

21. The non-transitory computer-readable medium of claim 17, wherein the CSS indicator includes a flag that indicates that the synchronization signal is not associated with the CSS for the downlink control channel.

22. The non-transitory computer-readable medium of claim 17, wherein a channel bandwidth, in which the synchronization signals are located, includes the plurality of synchronization signals and the plurality of CSSs.

23. The non-transitory computer-readable medium of claim 17,
wherein the UE is configured to access the CSS based at least in part on determining the location of the CSS, and
wherein the CSS includes information associated with accessing the network.

24. An apparatus for wireless communication, comprising:
means for receiving, when operating in a network that provides synchronization signals at a plurality of locations, a common search space (CSS) indicator for a synchronization signal of a plurality of synchronization signals,
wherein the CSS indicator indicates that the synchronization signal is not associated with a CSS for a downlink control channel,
wherein the CSS indicator includes information regarding another synchronization signal, of the plurality of synchronization signals, that is associated with the CSS,
wherein a quantity of synchronization signals, included in the plurality of synchronization signals, is greater than a quantity of CSSs included in a plurality of CSSs, and
wherein the plurality of CSSs include the CSS; and
means for determining a location of the CSS for the downlink control channel based at least in part on the CSS indicator.

25. The apparatus of claim 24, wherein the CSS indicator is received in a physical broadcast channel (PBCH).

26. The apparatus of claim 25, wherein the location of the CSS is determined based at least in part on the physical broadcast channel.

27. The apparatus of claim 24,
wherein the information regarding the other synchronization signal includes information identifying a location of the other synchronization signal; and
wherein the location of the CSS is determined based at least in part on the other synchronization signal.

28. The apparatus of claim 24, wherein the CSS indicator includes a flag that indicates that the synchronization signal is not associated with the CSS for the downlink control channel.

29. The apparatus of claim 24, wherein a channel bandwidth, in which the synchronization signals are located, includes the plurality of synchronization signals and the plurality of CSSs.

30. The apparatus of claim 24,
wherein the apparatus is configured to access the CSS based at least in part on determining the location of the CSS, and
wherein the CSS includes information associated with accessing the network.

* * * * *